June 15, 1943.  J. W. LEIGHTON  2,321,832
INDIVIDUAL WHEEL SUSPENSION
Filed June 21, 1941  2 Sheets-Sheet 2

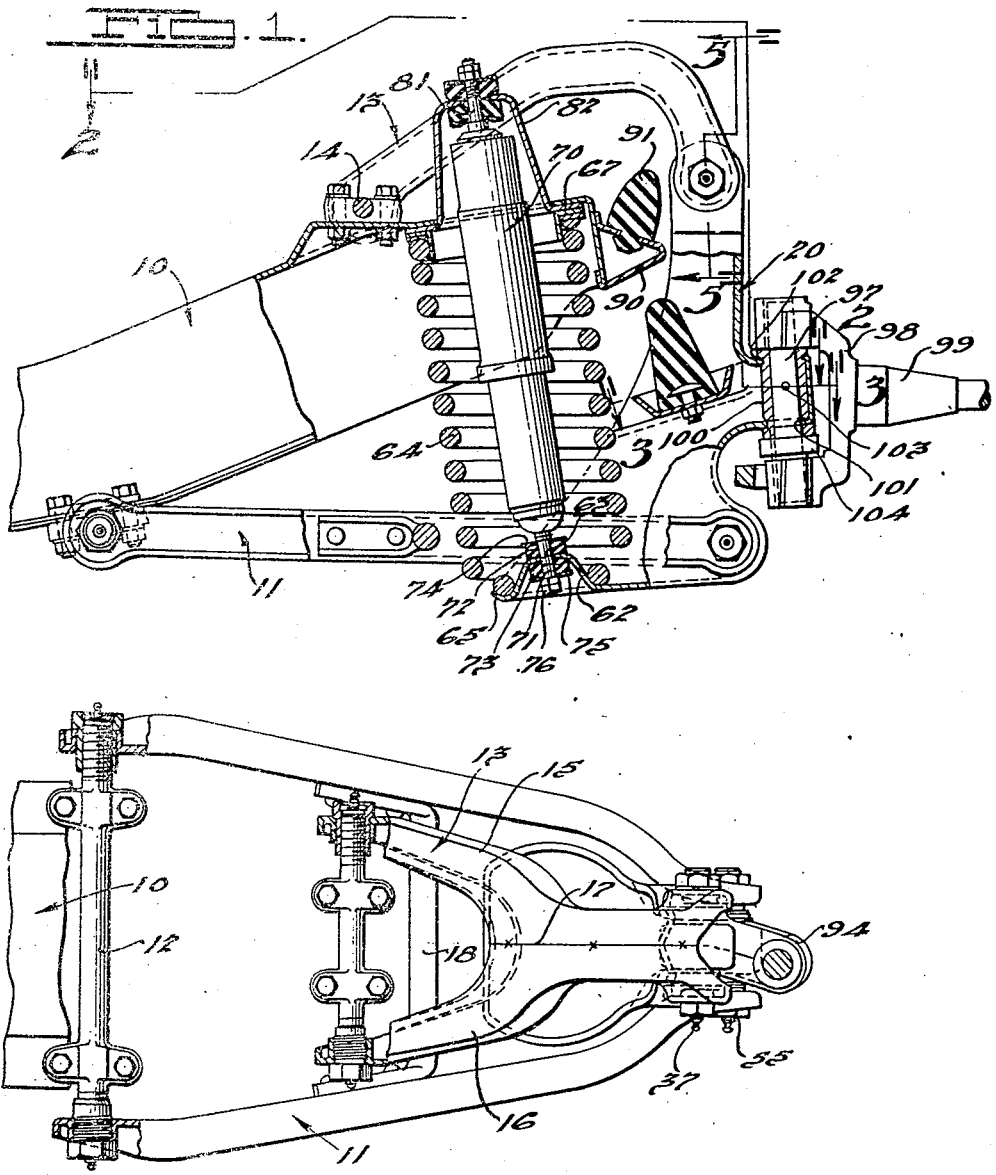

INVENTOR
John W. Leighton.
BY
Harness Dickey & Pierce
ATTORNEYS.

Patented June 15, 1943

2,321,832

UNITED STATES PATENT OFFICE 2,321,832

INDIVIDUAL WHEEL SUSPENSION

John W. Leighton, Port Huron, Mich.

Application June 21, 1941, Serial No. 399,065

9 Claims. (Cl. 280—96.2)

The invention relates generally to motor vehicles and it has particular relation to individual wheel suspensions.

The type of suspension to which the invention is particularly directed involves upper and lower arms pivotally connected to the vehicle frame and also pivotally connected at their outer ends to a wheel carrying member. Additionally, the suspension includes a coil spring disposed between a portion of the frame and a part of the suspension for resiliently supporting the frame on the latter. Again, the suspension includes bumper elements for limiting relative vertical movement of the suspension and the frame.

One object of the present invention is to provide in an individual wheel suspension of the general character indicated, an improved wheel carrying member extending vertically between the outer ends of the arms, which can be manufactured inexpensively and efficiently from sheet metal and which is strong and durable in use.

Another object of the invention is to provide a wheel carrying member, as indicated, which also serves as a support for one end of the coil spring.

Another object of the invention is to provide a wheel carrying member of this type, which also serves as a support for a bumper element adapted to limit relative vertical movement of the frame and suspension in one direction.

Another object of the invention is to provide a wheel carrying member of the type designated which includes multi-part stampings, adapted for efficient assembly and welding operations.

Another object of the invention is to provide a wheel carrying member constructed from sheet metal stampings, which presents a solid appearance as ordinarily viewed or seen, but which, next to the vehicle, is of hollow character.

Another object of the invention is to provide a wheel carrying member of hollow character such as mentioned, wherein shock absorbers and resilient connections are anchored interiorly thereof.

Another object of the invention is to provide an improved wheel carrying arm in an individual wheel suspension which includes an improved means for carrying a kingpin.

Other objects of the invention will become apparent from the following specification, from the drawings relating thereto, and from the claims hereinafter set forth.

For a better understanding of the invention, reference may be had to the drawings wherein:

Figure 1 is an end elevational view, partly in cross-section, of an individual wheel suspension constructed according to one form of the invention;

Fig. 2 is a cross-sectional view taken substantially along the line 2—2 of Fig. 1, with certain parts broken away;

Figure 3:
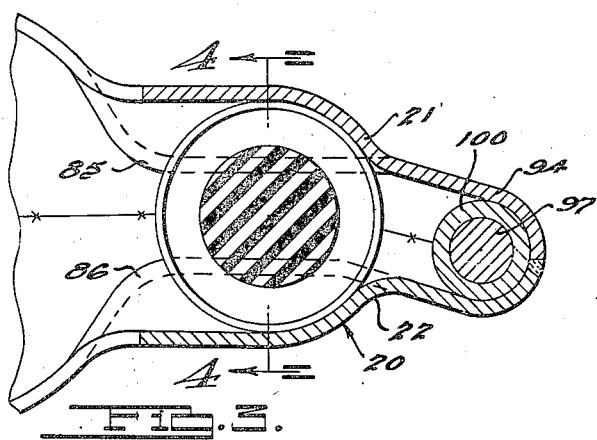
Fig. 3 is a cross-sectional view on a larger scale, taken substantially along the line 3—3 of Fig. 1.

Referring to Fig. 1, a chassis frame 10 is illustrated and it is to be understood that at each side adjacent the front of the vehicle, an individual wheel suspension is employed.

A lower wishbone 11 is pivotally connected to a bar 12 fastened to the frame 10 and an upper wishbone 13 is similarly pivoted to a bar 14 also fastened to the frame. The upper wishbone 13 comprises stampings 15 and 16 outwardly welded along the line of separation, indicated at 17, while the lower wishbone is connected intermediate its ends by means of a bar 18. At their outer ends, the upper and lower wish-bones are connected pivotally by an upwardly extending wheel carrying member 20.

Referring to Figs. 3 to 7, inclusive, the member 20 comprises two sheet metal stampings 21 and 22 of similar character and at their upper, lower and laterally outer sides, these stampings have mating edge flanges 23 and 24 welded together, as indicated at 25. Such flanges extend around the upper end of the member and downwardly along the inner side to the point indicated at 27 in Fig. 6 and from this point downwardly along the laterally inner side of the member, the latter is open with the two parts separated so that a hollow casing is formed which opens generally towards the chassis frame.

Figures 5, 6:
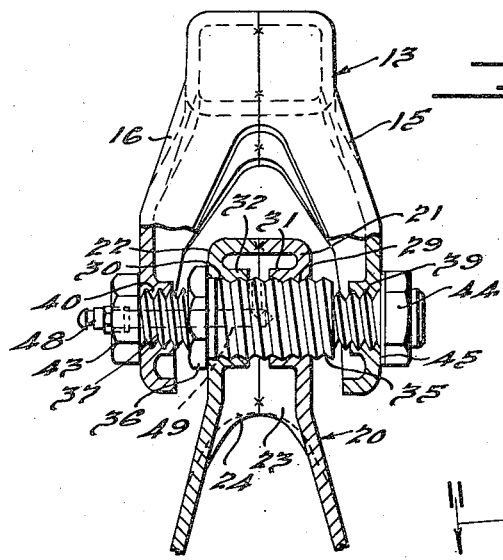
Fig. 5 is a cross-sectional view on a larger scale, taken substantially along the line 5—5 of Fig. 1.
Fig. 6 is a detail view of the wheel carrying member extending between the outer ends of the pivotal arms.

As best shown by Fig. 5, the upper end of the member 20, or rather the upper ends of the two parts 21 and 22, have aligned openings 29 and 30 and the metal is extruded inwardly as indicated at 31 and 32 to provide cylindrical walls of substantial length. A bushing 35 having a shallow, obtuse angle thread on its external surface is threaded into the aligned openings 29 and 30 in a frictional manner, so that when a head 36 on one end of the bushing is drawn up tightly against one side of the member, the bushing is positively locked in place against accidental loosening. This bushing is internally threaded with a standard or normal thread and turnably receives a similarly threaded pin 37, from which it follows that the bushing and member may be turned freely with respect to the pin. In turn, the pin is threaded into aligned openings 39 and 40 formed in spaced outer ends of the parts 15 and 16 of the upper wishbone and is locked against turning by means of a head 43 on one end and a nut 44 and lock washer 45 on its other end. Lubricant may be supplied to the bearing surfaces by means of a grease fitting 48 leading to a passageway 49 in the pin which in turn communicates with the external, threaded surface of the pin.

Figure 7:
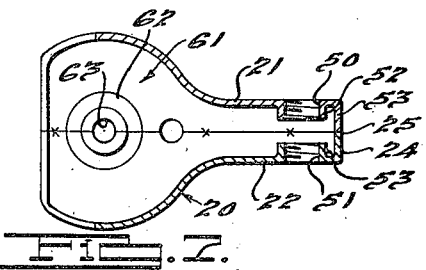
Fig. 7 is a cross-sectional view taken substantially along the line 7—7 of Fig. 6.

The lower end of the parts 21 and 22 of arm 20 have similar, aligned openings 50 and 51, shown in Fig. 7, and the walls of these openings are increased in length by having extruded portions 52 and 53. At its outer end, the lower wishbone 11 is fastened to a pin 55 and to the lower end of member 20 in a manner similar to that shown by Fig. 5, but it might be observed that the edge flanges on the lower arm are directed away from each other whereas in the upper arm, the edge flanges are directed towards each other. The pivotal connections at the upper and lower ends of the member 20 essentially are the same, however, in that a threaded pin is fixed to the wishbone arm in each case and a bushing turnable on the pin is fastened to the member.

At its lower end, the member 20 has a projection directed inwardly toward the vehicle frame, and, as shown best by Fig. 7, the two parts of the member are substantially widened in forming the projection so as to provide a spring supporting seat 61. This seat is located between the two parts of the lower wishbone and does not interfere with the latter. Substantially at the center of the spring seat 61, the metal is upwardly pressed, as indicated at 62, and is apertured as indicated at 63. Fig. 1 shows best how the lower end of a coil spring 64 is seated on the support 61 in encircling relation to the projection 62 and it might be noted in this connection that the metal at the free edge of the projection is curled upwardly as indicated at 65 so as to engage a portion of the lower coil of the spring.

The upper end of the spring 63 encircles and is seated against a ring 67 of angular cross-section which is fastened to the upper side of the frame. A telescopic type shock absorber 70 has a projecting pin 71 at its lower end which extends through the aperture 63 in the projecting portion 62 of the member 20 and at upper and lower sides of the aperture and encircling the stem 71, rubber washers or buffers 72 and 73 are provided. These washers are retained by metal discs 74 and 75 and the entire assembly is held connected to the projecting portion 62 by means of nuts 76 on the lower end of the stem 71.

The upper end of the shock absorber similarly has a pin 81 which extends through an apertured, thimble-shaped member 82 fastened to the frame. The connection between this upper end of the shock absorber and the member 82 is essentially the same as the connection to the lower end. It may be added that the apertures for receiving the pins 71 and 81 are slightly enlarged or else the metal preferably is thinned out adjacent the edge of the aperture so that universal movement of the pins with respect to the members connected to them may occur.

Figure 4:
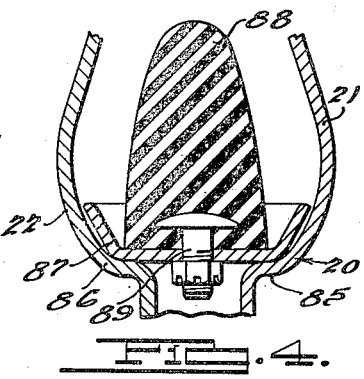
Fig. 4 is a cross-sectional view taken substantially along the line 4—4 of Fig. 3.

Now referring to Figs. 3 and 4, in particular, it will be noted that substantially at the center of the member 20, the two parts 21 and 22 thereof are pressed inwardly as indicated at 85 and 86 to form a support for a saucer-shaped element 87 which may be welded thereto. A rubber bumper element 88 is fastened to the base of the element 87 by means of a headed screw element 89 embedded in the rubber and having a nut on its lower end beneath the element. With reference to this bumper element, it will be observed in Figure 1 that it is in a position to be engaged by a projecting portion 90 fastened to the frame and this portion 90 is of such width that it may enter between the parts 21 and 22 of the member 20 during relative movement of the suspension with respect to the chassis frame. A second bumper element 91, fastened to the portion 90, is in position to engage parts of the upper arm 13. These bumper elements resiliently limit relative vertical movement of the arms with respect to the chassis frame.

Now referring to Figs. 1, 3, and 6, it will be noted that the two parts 21 and 22 forming the member 20 are shaped to provide a lateral projecting portion 94 which in a vertical direction is of partially cylindrical character and which has upper and lower end walls. These end walls, as shown by Fig. 6, are apertured as indicated at 95 and 96 and accommodate a kingpin 97 forming part of a knuckle bracket 98 having an axle 99 for supporting a wheel. A cylindrical bearing element 100 extends through the portion 94 and has grooves 101 and 102 receiving the edges of the metal around the apertures in the upper and lower walls and provision of the grooves 101 and 102 locates the element 100 in vertical position. This element is welded to the member 20 and it may be observed that the element may be easily assembled with the member 20 during assembly of the parts 21 and 22, since half of each part will receive half of the element. The pin 97 preferably is locked to the element 100 and to the arm 20 as by a pin 103 and the two arms of the knuckle bracket 98 have suitable bearing engagement with the upper and lower ends of the pin. It is to be noted that a bearing collar or ring 104 is provided between the lower end of the element 100 and the lower part of the knuckle bracket so as to provide a thrust bearing.

From the foregoing description, it will be apparent that the member 20 may be constructed inexpensively from sheet metal and that the two parts thereof may subsequently be welded to form a strong structure. This structure presents a solid or closed appearance to the front, to the rear, and to the laterally outer side of the vehicle and hence appears to be a solid member. Toward the inner side of the member, a hollow structure is provided and this provides a place for connecting the lower end of the shock absorber, for locating and supporting the lower end of the spring, and for locating and supporting a bumper element. Thus, the appearance of the suspension is definitely enhanced. Additionally, the member is strong due to its construction and shape and since it carries the wheel, this is particularly important. Altogether, the structure provides a more efficient and less expensive wheel suspension which can be manufactured and assembled without difficulty.

While it has been stated that the member 20 is constructed from stampings, it should be understood that the parts may be drawn from sheet metal. Again, the member might be drawn from sheet metal as a single integral piece, and in this case formation of the aperture projections 52 and 53, could be effected subsequent to main drawing operations or as found most desirable. Also, the flanges 23 and 24 might be terminated higher than the point 27 if desired, to facilitate the drawing operation. In other words, the hollow form would remain generally the same but could be varied to fit the requirements of drawing from an integral piece of sheet metal.

Although only one form of the invention has been illustrated and described in detail, it will be apparent to those skilled in the art that various modifications may be made without departing from the scope of the appended claims.

What is claimed is:

1. In combination, a vehicle frame, upper and lower arms pivotally connected to the frame and extending laterally therefrom, a channel shape, sheet metal wheel carrying member extending vertically between the outer ends of the arms, means pivotally connecting the outer ends of the arms to the member, an extension on the lower part of the member forming a seat for a coil spring, and a coil spring disposed between a part of the frame and said extension.

2. In combination, a vehicle frame, upper and lower arms pivotally connected to the frame and extending laterally therefrom, a wheel carrying member extending vertically between the outer ends of the arms, means pivotally connecting the outer ends of the arms to the member, and an extension on the lower part of the member forming a seat for a coil spring, and a coil spring disposed between a part of the frame and said extension, said member comprising two stamped metal parts connected together and jointly forming the extension.

3. In an individual wheel suspension on a vehicle frame having laterally extending arms, a vertically extending wheel-carrying member comprising vertically arranged sheet metal sides having upper and lower aligned pairs of cylindrical projections forming pin-receiving openings for connecting the member to the arms, said sides vertically intermediate the pairs of projections having hollow offset portions which are vertically apertured to receive a king pin, and a tubular bearing projecting through and fastened in said vertical aperture.

4. In an individual wheel suspension on a vehicle frame having laterally extending arms, a vertically extending wheel carrying member comprising a hollow casing having upper and lower pin receiving openings for connecting the member to the arms, and a hollow offset portion on the casing intermediate its upper and lower ends, said portion having upper and lower walls provided with vertically arranged apertures for receiving a king pin.

5. In an individual wheel suspension on a vehicle frame having laterally extending arms, a vertically arranged sheet metal hollow casing having upper and lower pin receiving openings for pivotally connecting the arms to the casing, a hollow offset portion on the casing intermediate upper and lower ends of the latter and having upper and lower walls provided with vertically arranged apertures for receiving a king pin, and a tubular bearing in the offset portion and fastened in alignment with the vertical apertures.

6. In an individual wheel suspension on a vehicle frame having laterally extending arms, a vertically arranged sheet metal hollow casing having upper and lower pin receiving openings for pivotally connecting the arms to the casing, said casing intermediate its ends having its side walls pressed towards each other to provide shoulders on its interior, and a bumper element supported on the shoulders.

7. In an individual wheel suspension on a vehicle frame having vertically spaced, laterally extending arms, a vertically arranged wheel supporting member extending between the outer ends of the arms and comprising a pair of sheet metal stampings having laterally extending, spaced walls provided with flanges at their laterally outer edges which are bent towards each other and which have their edges welded together so as to form a transverse web at the other edges of the laterally extending walls, said transverse web extending around and over the upper and lower ends of the walls, and inwardly directed projections on the walls respectively at their upper and lower ends adapted to receive pins for connecting the arms to the member.

8. In an individual wheel suspension having laterally extending arms, a wheel carrying member comprising sheet metal stampings jointly shaped to provide a hollow casing, means at the upper and lower ends of the casing for fastening to the arms, and integral offset portions on the tsampings intermediate their upper end lower ends and jointly forming a hollow portion having upper and lower walls offset from the remainder of the arm, said walls having vertically aligned openings for receiving a king pin.

9. In an individual wheel suspension on a vehicle frame having laterally extending arms, a vertically extending wheel carrying member comprising a hollow casing formed from sheet metal having upper and lower pin receiving openings for connecting the member to the arms, and a hollow offset part on the casing intermediate its upper and lower ends and provided with a vertically arranged opening for receiving a king pin, said offset part comprising an integral extension of the sheet metal wall of the casing so that it forms part of the stamped sheet metal.

JOHN W. LEIGHTON.

CERTIFICATE OF CORRECTION.

Patent No. 2,321,832.            June 15, 1943.

JOHN W. LEIGHTON.

It is hereby certified that error appears in the printed specification of the above numbered patent requiring correction as follows: Page 3, second column, line 30, for "other" read --outer--; line 43, for "tsampings" read --stampings--; and same line, for "end" read --and--; and that the said Letters Patent should be read with this correction therein that the same may conform to the record of the case in the Patent Office.

Signed and sealed this 27th day of July, A. D. 1943.

(Seal)

Henry Van Arsdale,
Acting Commissioner of Patents.